United States Patent
Nakane (10) Patent No.: US 10,338,322 B2
(45) Date of Patent: Jul. 2, 2019

(54) CLEANING TOOL

(71) Applicant: FUJIKURA LTD., Tokyo (JP)

(72) Inventor: Junichi Nakane, Sakura (JP)

(73) Assignee: FUJIKURA LTD., Tokyo (JP)

( * ) Notice: Subject to any disclaimer, the term of this patent is extended or adjusted under 35 U.S.C. 154(b) by 303 days.

(21) Appl. No.: 15/253,083

(22) Filed: Aug. 31, 2016

(65) Prior Publication Data

US 2017/0059788 A1    Mar. 2, 2017

(30) Foreign Application Priority Data

Sep. 1, 2015 (JP) .................. 2015-171816

(51) Int. Cl.
*G02B 6/36* (2006.01)
*G02B 6/38* (2006.01)

(52) U.S. Cl.
CPC ........ *G02B 6/3866* (2013.01); *B08B 2240/02* (2013.01)

(58) Field of Classification Search
CPC ......... G02B 6/3866; B08B 1/00; B08B 1/001; B08B 1/003; B08B 1/006; B08B 1/008; B08B 1/04; B08B 2240/02
USPC ................... 15/97.1, 210.1; 385/134, 147
See application file for complete search history.

(56) References Cited

U.S. PATENT DOCUMENTS

| 6,623,175 B2 | 9/2003 | Suematsu et al. |
| 8,402,587 B2 | 3/2013 | Sugita et al. |
| 2003/0031425 A1 | 2/2003 | Suematsu et al. |
| 2010/0043159 A1* | 2/2010 | Fujiwara .............. B08B 1/00 15/97.1 |
| 2011/0047731 A1 | 3/2011 | Sugita et al. |
| 2011/0072600 A1* | 3/2011 | Nakane ............... B08B 1/04 15/97.1 |
| 2011/0154599 A1* | 6/2011 | Nakane ............... B08B 1/04 15/210.1 |
| 2012/0017384 A1* | 1/2012 | Fujiwara ............ G02B 6/3866 15/97.1 |

(Continued)

FOREIGN PATENT DOCUMENTS

| JP | 2003-090930 A | 3/2003 |
| JP | 4579330 B2 | 11/2010 |
| WO | 2009/119437 A1 | 10/2009 |

OTHER PUBLICATIONS

Office Action in counterpart Japanese Patent Application No. 2015-171816 dated Mar. 28, 2017 (5 pages).

*Primary Examiner* — Mark Spisich
(74) *Attorney, Agent, or Firm* — Osha Liang LLP (57) ABSTRACT

A cleaning tool includes: a tool body; and an insertion part provided projecting from the tool body, the insertion part being configured to be movable in a predetermined direction with respect to the tool body, the insertion part including a head unit, the head unit being configured to press a cleaning element against a cleaning target with a pressing surface, wherein by relatively moving the tool body and the insertion part, the cleaning element is supplied and recovered, and the head unit is rotated in a rotation direction with the predetermined direction as an axis, the head unit includes a head member and a tubular member, the head member including the pressing surface, the head member being inserted into the tubular member with the pressing surface in a projected state, the cleaning element is stretched around the pressing surface.

5 Claims, 6 Drawing Sheets

(56) References Cited

U.S. PATENT DOCUMENTS

2012/0066849 A1   3/2012   Fujiwara

* cited by examiner

FIG. 5A (THIS EMBODIMENT)

FIG. 5B (FIRST MODIFICATION)

FIG. 5C (SECOND MODIFICATION)

CLEANING TOOL

TECHNICAL FIELD

The present invention relates to cleaning tools.

Priority is claimed on Japanese Patent Application No. 2015-171816, filed Sep. 1, 2015, the content of which is incorporated herein by reference.

BACKGROUND ART

Optical connectors are coupled together by abutting end surfaces of optical fibers against one another in joining end surfaces (ferrule end surfaces) of the optical connectors. Dirt on the joining end surface of the optical connector or the end surface of an optical fiber causes such as damage to the optical connector and the optical fiber, and an increase in transmission loss. Thus, the joining end surfaces of the optical connectors need to be cleaned before the abutting connection. As a tool for cleaning, for example, Patent Literature 1 describes a cleaning tool including: a tool body and an insertion part (extended part) having a head member to press a cleaning element against a joining end surface of an optical connector. With this cleaning tool, by moving the tool body with respect to the insertion part in a state where the cleaning element is pressed against the optical connector, it is possible to supply and recover the cleaning element, and to rotate the head member, to wipe the joining end surface of the optical connector with the cleaning element.

CITATION LIST

Patent Literature

Patent Literature 1: JP-A-4579330

SUMMARY OF INVENTION

Technical Problem

As illustrated in FIG. 3 in Patent Literature 1, by merely disposing the cleaning element in a guide groove, the cleaning element possibly drops during a rotation of the head member.

In FIG. 33 in Patent Literature 1, to prevent the drop, the cleaning element is inserted through an insertion hole formed at a leading end part of the head member. Because an opening of the insertion hole is formed on the end surface of the head member, however, a pressing surface narrows down by a wall thickness of an outer periphery of the insertion hole. Narrowing down the pressing surface possibly causes poor cleaning.

The present invention aims to achieve enlarging a region of a pressing surface while restraining dropping of a cleaning element during a rotation of a head member.

Solution to Problem

A primary aspect of the invention to achieve the aforementioned objective is a cleaning tool including: a tool body; and an insertion part provided projecting from the tool body, the insertion part being configured to be movable in a predetermined direction with respect to the tool body, the insertion part including a head unit, the head unit being configured to press a cleaning element against a cleaning target with a pressing surface, wherein by relatively moving the tool body and the insertion part, the cleaning element is supplied and recovered, and the head unit is rotated in a rotation direction with the predetermined direction as an axis, the head unit includes a head member and a tubular member, the head member including the pressing surface, the head member being inserted into the tubular member with the pressing surface in a projected state, the cleaning element is stretched around the pressing surface, and when viewing the pressing surface from the predetermined direction, the cleaning element is disposed in a clearance between an outer surface of the head member and an inner peripheral surface of the tubular member on a supply side, and the cleaning element is disposed in a clearance between an outer surface of the head member and an inner peripheral surface of the tubular member on a recovery side.

Other features of the present invention will be made clear by the description in the specification and drawings below.

Advantageous Effects of Invention

According to the present invention, an enlargement of a region of a pressing surface can be achieved while dropping of a cleaning element during a rotation of a head member is restrained.

BRIEF DESCRIPTION OF DRAWINGS

FIG. 4A and FIG. 4B are enlarged perspective views of a head unit 24, FIG. 4A illustrates the head unit 24 to which a metal tube 27 is mounted, and FIG. 4B illustrates the head unit 24 viewing the head unit 24 through the metal tube 27.

DESCRIPTION OF EMBODIMENTS

At least the following matters are made clear from the Description and Drawings described below.

A cleaning tool is disclosed including: a tool body; and an insertion part provided projecting from the tool body, the insertion part being configured to be movable in a predetermined direction with respect to the tool body, the insertion part including a head unit, the head unit being configured to press a cleaning element against a cleaning target with a pressing surface, wherein by relatively moving the tool body and the insertion part, the cleaning element is supplied and recovered, and the head unit is rotated in a rotation direction with the predetermined direction as an axis, the head unit includes a head member and a tubular member, the head member including the pressing surface, the head member being inserted into the tubular member with the pressing surface in a projected state, the cleaning element is stretched around the pressing surface, and when viewing the pressing surface from the predetermined direction, the cleaning element is disposed in a clearance between an outer surface of the head member and an inner peripheral surface of the tubular member on a supply side, and the cleaning element is disposed in a clearance between an outer surface of the head member and an inner peripheral surface of the tubular member on a recovery side. The cleaning tool can achieve enlarging a region of the pressing surface while restraining dropping of the cleaning element during the rotation of the head member.

The head unit preferably includes a base member configured to receive a force in the rotation direction, and the head member is configured of a different member separate from the base member. This makes mounting of the tubular member easy.

The head member preferably includes a collar part, and when viewing the pressing surface from the predetermined direction, the collar part is preferably arranged to conceal at least a part of an end part of the tubular member. This allows restraining damage to a cleaning target with an end part of the tubular member.

The head member preferably includes a supply-side guide groove and a recovery-side guide groove formed along the predetermined direction, and the cleaning element is preferably disposed in the supply-side guide groove and the recovery-side guide groove. This can inhibit dropping of the cleaning element during the rotation of the head member.

The head member is preferably made of a resin, the tubular member is preferably made of a metal, and the tubular member is preferably crimped to the head member to be secured to the head member in the predetermined direction and the rotation direction. This allows the head member to be reinforced with the tubular member.

Embodiment

<<Configuration of Cleaning Tool 1>>

In the following description each of the directions is defined as illustrated in the drawings. That is, a direction in which the insertion part 20 extends from a tool body 10 is referred to as a "front-rear direction." That is, an axial direction of the tubular-shaped insertion part 20 is the "front-rear direction." In this front-rear direction, the insertion part 20 side viewed from the tool body 10 is referred to as the "front" and the opposite side as the "rear." An axial direction of a rotating shaft of a take-up reel 31 (see FIG. 2) in the tool body 10 is referred to as a "right-left direction." The right side viewed from the rear side to the front side is referred to as the "right," and the opposite side as the "left." A direction perpendicular to the front-rear direction and the right-left direction is referred to as an "up-down direction."

Figure 1:
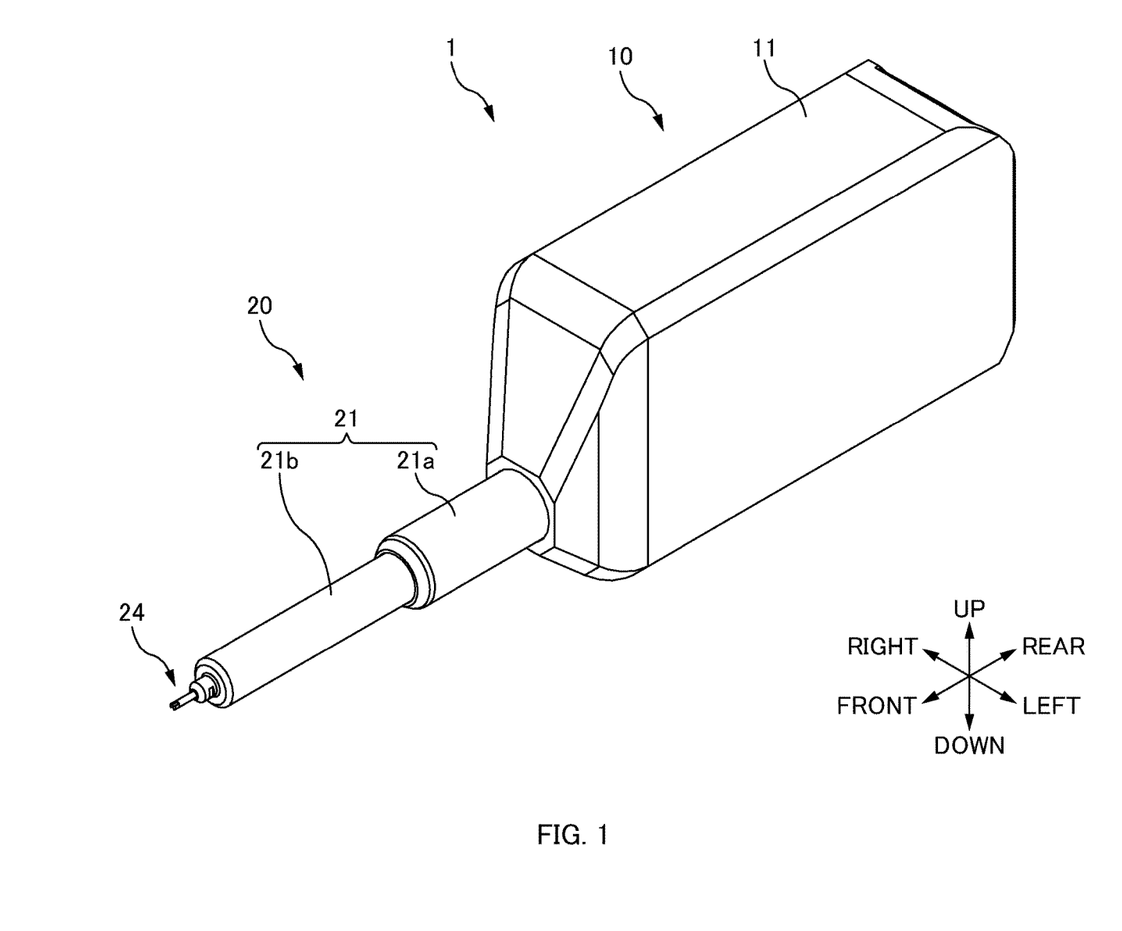
FIG. 1 is an overall perspective view of a cleaning tool 1 according to an embodiment.
Figure 2:
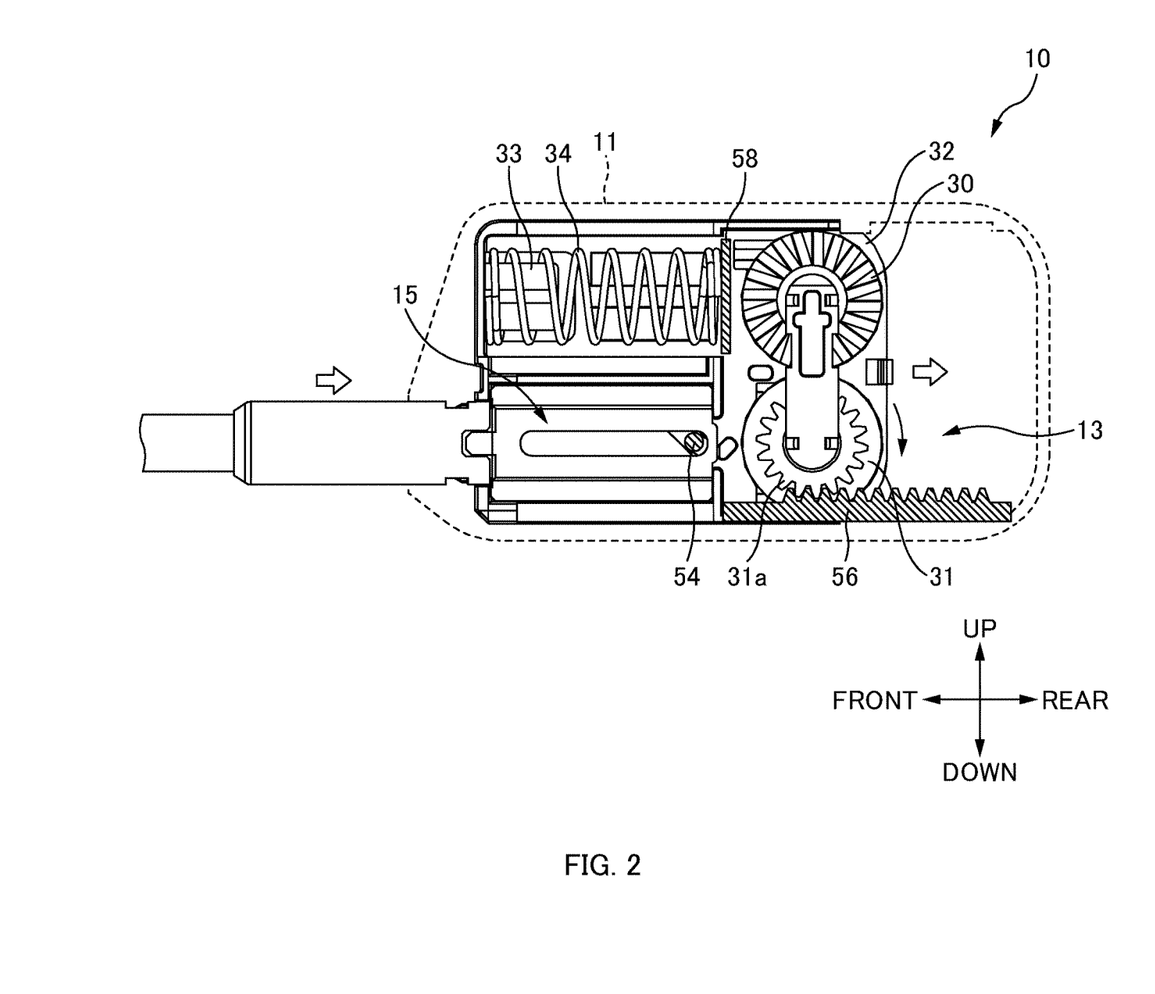
FIG. 2 is a drawing illustrating an internal configuration of a tool body 10 of the cleaning tool 1.
Figure 3:
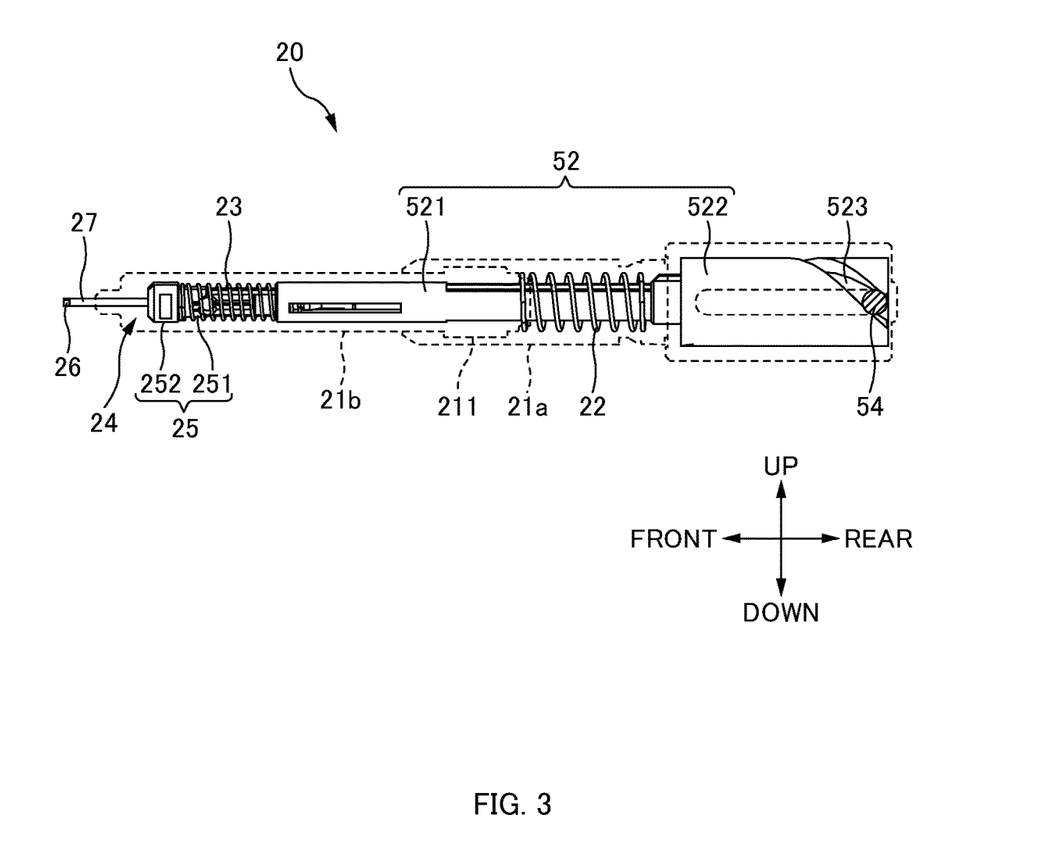
FIG. 3 is a drawing illustrating an internal configuration of an insertion part 20 of the cleaning tool 1.
Figure 4A:
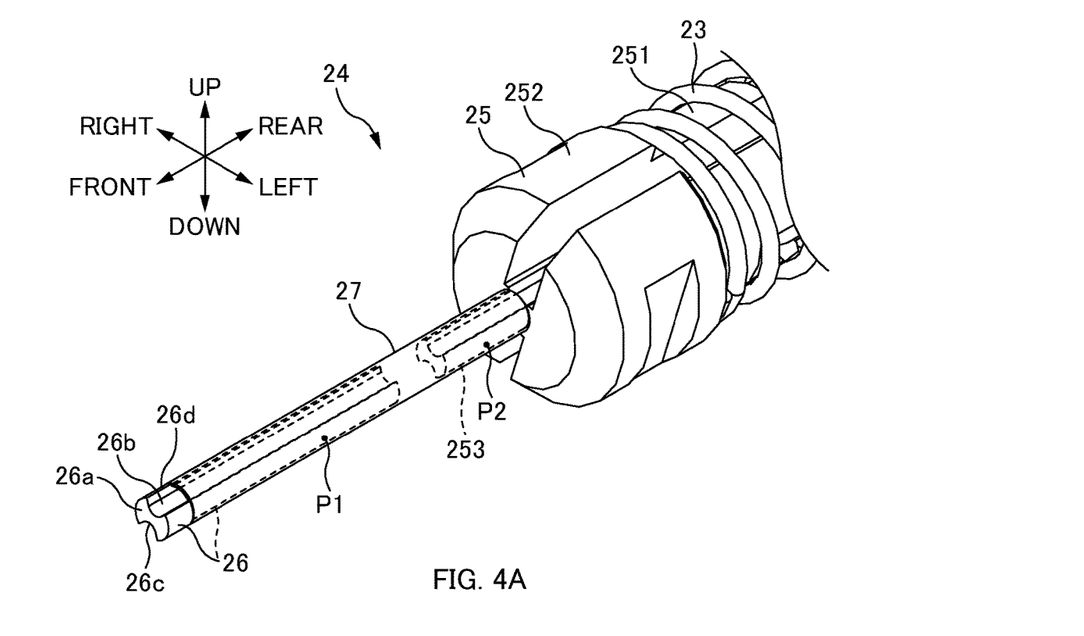
Figure 4B:
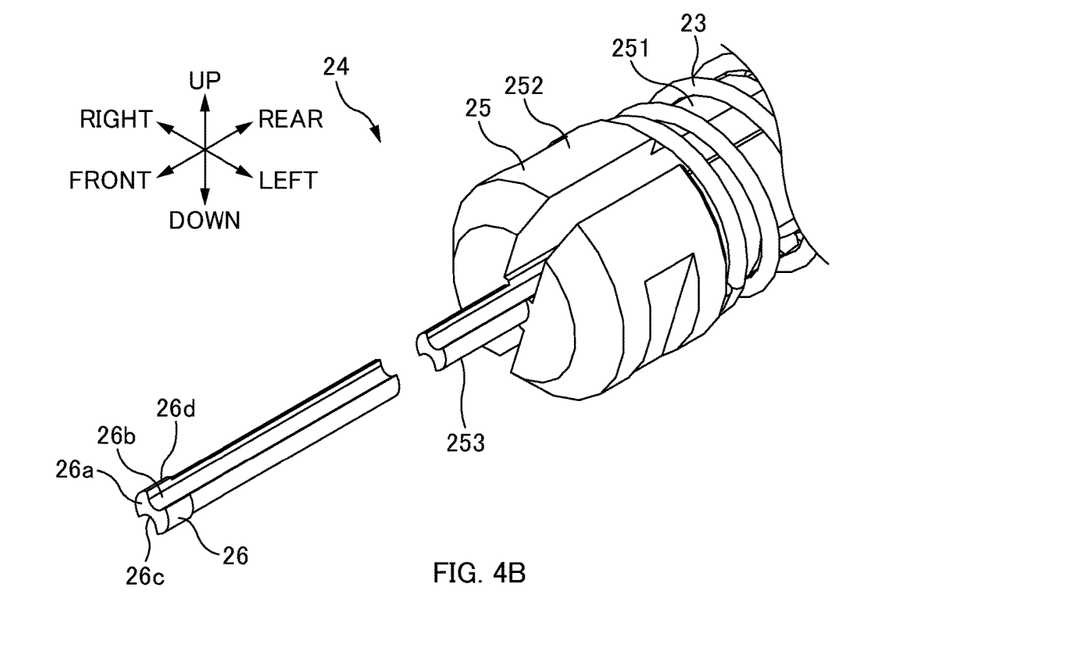

FIG. 1 is an overall perspective view of the cleaning tool 1 in this embodiment. FIG. 2 is a drawing illustrating an internal configuration of the tool body 10 of the cleaning tool 1. FIG. 3 is a drawing illustrating an internal configuration of the insertion part 20 of the cleaning tool 1. FIG. 4A and FIG. 4B are enlarged perspective views of a head unit 24, FIG. 4A illustrates the head unit 24 to which a metal tube 27 is mounted, and FIG. 4B illustrates the head unit 24 viewing the head unit 24 through the metal tube 27.

The cleaning tool 1 is a tool to clean a ferrule end surface (optical fiber end surface) of an optical connector and the cleaning tool 1 includes the tool body 10 and the insertion part 20. The tool body 10 and the insertion part 20 are configured to be relatively movable in the front-rear direction.

The tool body 10 is a section for a worker to grip the cleaning tool 1, and the tool body 10 includes a case body 11, a feeding mechanism 13, and a rotary mechanism 15.

The case body 11 is a tubular member with an approximately rectangular parallelepiped shape and internally includes the feeding mechanism 13 and the rotary mechanism 15. An insertion protruded part 54, a serrated gear receiving part 56, and a pressing plate 58 to press a coil spring 34 are secured to the case body 11.

The insertion protruded part 54 projects from the case body 11 toward the inside (the right side) and is formed into an approximately columnar shape (or a pin shape). A projection height and an outer diameter of the insertion protruded part 54 are configured such that the insertion protruded part 54 can fit in a cam groove 523 of a rotary tube part 522, which will be described later.

The gear receiving part 56 is provided at a lower part of the case body 11. The gear receiving part 56 is formed with a plurality of receiving teeth along the front-rear direction. These receiving teeth mesh with a gear wheel of a gear 31a. The gear receiving part 56 provides a rotational force to the gear 31a according to the relative movement between the tool body 10 and the insertion part 20 in the front-rear direction to drive (rotate) the take-up reel 31.

The pressing plate 58 is a plate-shaped member formed to project from the case body 11 to the inner side. One end (rear end) of the coil spring 34 is disposed to the pressing plate 58. When the tool body 10 moves relative to the insertion part 20, the pressing plate 58 presses the coil spring 34.

The feeding mechanism 13 is used to supply and recover the cleaning element. The feeding mechanism 13 includes a supply reel 30, the take-up reel 31, the gear 31a, a supporting part 32, a retaining tube part 33, and the coil spring 34.

The supply reel 30 is a reel to supply the cleaning element to the head unit 24 and winds the cleaning element.

The take-up reel 31 is a reel to roll up and recover the cleaning element after use.

The gear 31a is a gear wheel with a plurality of teeth formed in a periphery of a disk-shaped plate and the gear 31a is mounted to the take-up reel 31. A transmission mechanism (not illustrated) is disposed between the gear 31a and the take-up reel 31. A rotation of the gear 31a in a predetermined direction rotates the take-up reel 31 together, but the rotation of the gear 31a in the opposite direction does not rotate the take-up reel 31.

The supporting part 32 rotatably supports the supply reel 30 and the take-up reel 31. The supporting part 32 is provided to be relatively movable with respect to the case body 11 in the front-rear direction (corresponds to the predetermined direction).

The retaining tube part 33 is a member to which the coil spring 34 is mounted to position this coil spring 34. The retaining tube part 33 projects from an end part on the front side of the supporting part 32 to the rear.

The coil spring 34 is provided between the retaining tube part 33 of the supporting part 32 and the pressing plate 58 of the case body 11. When the supporting part 32 moves rearward with respect to the case body 11 (the arrow direction in FIG. 2), the coil spring 34 urges the supporting part 32 forward with respect to the case body 11.

The rotary mechanism 15 rotates the head unit 24 (the head member 26). The rotary mechanism 15 includes a rotary shaft 52 rotatable with respect to the case body 11.

The rotary shaft 52 includes a guide tube part 521 and the rotary tube part 522. The rotary shaft 52 is formed internally with an insertion hole (not illustrated) through which the cleaning element is inserted. The insertion hole has an approximately circular shape in cross section and is formed from a front end of the guide tube part 521 to a rear end of the rotary tube part 522.

The guide tube part 521 is formed into an approximately cylindrical shape. A base part 251 of the base member 25 of the head unit 24 can fit in the front end part. On an inner surface on the front end part of the guide tube part 521, a wall-thickened rotary stopper (not illustrated) is formed.

The rotary tube part 522 is provided to the rear end of the guide tube part 521 and formed into an approximately cylindrical shape thicker than the guide tube part 521. In an outer surface of the rotary tube part 522, the cam groove 523 into which the insertion protruded part 54 of the case body 11 is to be inserted is formed.

The cam groove 523 is formed into a spiral pattern inclined with respect to an axial direction (the front-rear direction) of the rotary tube part 522 on the outer peripheral surface of the rotary tube part 522. In view of this, the movement of the rotary shaft 52 in the front-rear direction moves the rotary tube part 522 along the cam groove 523. Thus, the rotary shaft 52 rotates in the axial direction with the front-rear direction as the axis (hereinafter also referred to as a rotation direction). In association with this rotation, the head unit 24 also rotates in the same direction.

The insertion part 20 is a section to be inserted into an insertion port of a cleaning target (an optical connector) and is provided to project forward from the tool body 10. The insertion part 20 is movable in the front-rear direction (corresponds to a predetermined direction) with respect to the tool body 10. The insertion part 20 of this embodiment includes an insertion tube body 21, a tube part spring 22, a head spring 23, and the head unit 24.

The insertion tube body 21 includes a base tube part 21a, and a cylindrical leading end tube part 21b that extends forward from the tip end (the front side end) of the base tube part 21a. The base tube part 21a is secured to the supporting part 32. The leading end tube part 21b is formed thinner than the base tube part 21a and is formed so as to be positioned when inserted into the insertion port of the optical connector.

The tube part spring 22 is used to urge the leading end tube part 21b to the front side with respect to the supporting part 32 such that the leading end tube part 21b can retreat. The tube part spring 22 is disposed between a rear end of the leading end tube part 21b and the supporting part 32. The leading end tube part 21b receives a force to the front side from the tube part spring 22. Meanwhile, contacting of a protruding part 211 of the leading end tube part 21b with an inner wall of the base tube part 21a prevents the leading end tube part 21b from dropping to the front side from the base tube part 21a.

The head spring 23 is used to urge the head unit 24 to the front side with respect to the guide tube part 521 such that the head unit 24 can retreat. The head spring 23 is disposed between the front end of the guide tube part 521 and a flange part 252 of the base member 25 of the head unit 24.

The head unit 24 is a section that presses the cleaning element against a cleaning target surface (a ferrule end surface of the optical connector) with the tip end surface (a pressing surface 26a, which will be described later). The head unit 24 includes a base member 25, a head member 26, and the metal tube 27 (equivalent to a tubular member). The head unit 24 is pushed with the head spring 23 to the front side such that the head unit 24 can retreat.

The base member 25 is a member made of a resin and includes the base part 251, the flange part 252, and a leading end part 253.

The base part 251 is provided in an insertable manner into an insertion hole on the guide tube part 521. The base part 251 includes a flat part (not illustrated) formed along the front-rear direction. This flat part is disposed opposed to a rotary stopper of the guide tube part 521. This restricts a rotation of the base part 251 with respect to the guide tube part 521 (the rotary shaft 52). That is, the base member 25 is movable relative to the rotary shaft 52 in the front-rear direction. Additionally, the base member 25 receives a rotational force (a force in the rotation direction) around the axis of the rotary shaft 52 and rotates together with the rotary shaft 52 in the same direction.

The flange part 252 is formed on the front end of the base part 251. The head spring 23 is provided between the rear end of the flange part 252 and the tip end of the guide tube part 521.

The leading end part 253 is formed so as to project forward from a center of an end surface on the front side of the flange part 252. This leading end part 253 is a section to be inserted into the metal tube 27 and has a shape almost identical to a part of the head member 26 to the rear side with respect to a collar part 26d (see FIG. 4A and FIG. 4B). That is, the leading end part 253 is provided with guide grooves corresponding to a supply-side guide groove 26b and a recovery-side guide groove 26c of the head member 26 on each of a supply side and a recovery side of the cleaning element.

The head member 26 is a member made of a resin and is a member that is separate from the base member 25 (a different member). The head member 26 is disposed forward with respect to the base member 25 (the leading end part 253) via the metal tube 27. The head member 26 includes the pressing surface 26a, the supply-side guide groove 26b, the recovery-side guide groove 26c, and the collar part 26d.

The pressing surface 26a is a tip end surface (a front side end surface) of the head member 26 and is a surface to which the cleaning element is pressed to the cleaning target surface (the ferrule end surface of the optical connector). The pressing surface 26a of this embodiment is formed into a plane perpendicular to the front-rear direction. However, the configuration is not limited to this, and the pressing surface 26a may have a curvature (for example, may be a convex shape or a U shape on the front side).

The supply-side guide groove 26b is a groove to guide a feeding movement when the cleaning element is supplied to the pressing surface 26a. The supply-side guide groove 26b is formed along the front-rear direction on a side part (an upper part in FIG. 4) of the head member 26.

The recovery-side guide groove 26c is a groove to guide the feeding movement when the cleaning element is recovered from the pressing surface 26a. The recovery-side guide groove 26c is formed along the front-rear direction on a side part on the opposite side from the supply-side guide groove 26b of the head member 26 (a lower part in FIG. 4).

The collar part 26d is provided on the front side with respect to the tip end of the metal tube 27. An outer diameter of the collar part 26d is almost the same as an outer diameter of the metal tube 27 (see FIG. 5A). That is, the outer diameter of the collar part 26d is greater than an inner diameter of the metal tube 27. Providing the collar part 26d can restrain damage to the cleaning target with the end part (the leading end part) of the metal tube 27.

Here, assuming that the base member 25 and the head member 26 are integrally molded with, for example, resin. Providing the collar part 26d will make mounting of the metal tube 27 difficult (the metal tube 27 cannot be inserted from the front). In this embodiment, the head member 26 is separated from (a different member from) the base member 25. Thus, after mounting the metal tube 27 to the leading end part 253 of the base member 25, a rear end part (a base part) of the head member 26 can be inserted into the metal tube 27, making the mounting of the metal tube 27 easy.

The metal tube 27 is a cylindrically-shaped thin metallic member. The metal tube 27 prevents the cleaning element from dropping and reinforces the head member 26. This embodiment forms a diameter of the connector of the cleaning target to be thinner than a usual diameter and also forms the head member 26 to be thin. In view of this, suppose that a head is made of a resin alone (for example, the base member 25 and the head member 26 are integrally molded), pressing the pressing surface 26a against the cleaning target possibly breaks the elongated head member 26. Providing the metal tube 27 allows inhibiting damage to the head member 26.

The head member 26 with the pressing surface 26a and the collar part 26d projected is inserted into the front side of the metal tube 27. The leading end part 253 of the base member 25 is inserted inside the rear side of the metal tube 27. The metal tube 27 is crimped to the head member 26 from both the right and left sides at a position P1 in FIG. 4A. The metal tube 27 is crimped to the leading end part 253 of the base member 25 from both the right and left sides at a position P2. Thus, the metal tube 27 is secured to the head member 26 and the base member 25 in the front-rear direction and the rotation direction with the front-rear direction as its axis. That is, the head member 26 and the base member 25 move integrally in the front-rear direction via the metal tube 27 and rotate integrally in the rotation direction. To crimp the metal tube 27, the head member 26 and the base member 25 are positioned (the guide grooves are positioned) with a dedicated tool.

In this embodiment, the metal tube 27 is crimped in the two locations (the position P1 and the position P2) in the front-rear direction; however, the locations may be equal to or more than three. At least one or more of each of a part where the metal tube 27 overlaps with the head member 26 and a part where the metal tube 27 overlaps with the leading end part 253 of the base member 25 may be provided. The locations in which the metal tube 27 is crimped are preferably parts other than the supply-side guide groove 26b and the recovery-side guide groove 26c, and are preferably inside the leading end tube part 21b. The metal tube 27 may be secured to the base member 25 and the head member 26 not by crimping but by another method (for example, such as a bonding).

The cleaning element is disposed so as to pass through the insertion hole inside the rotary shaft 52 from the supply reel 30, to go through the supply-side guide groove 26b, the pressing surface 26a, and the recovery-side guide groove 26c of the head member 26 of the head unit 24, and to be rolled up by the take-up reel 31. Thus, the cleaning element is stretched around the pressing surface 26a. There are no particular limitations on the cleaning body. Commonly known and suitable cleaning fabric (non-woven fabric or woven fabric) that has been processed into a shape like a thread can be employed. For example, one composed of ultrafine fiber such as polyester and nylon can be cited. As the cleaning body, one made of tape-like material of narrow width can also be used.

<<Operation of Cleaning Tool 1>>

Inserting the leading end tube part 21b of the insertion part 20 into a connector insertion port (not illustrated) of the optical connector enters the head unit 24 into the insertion port while an outer surface of the leading end tube part 21b is positioned to an inner wall of the optical connector. Then, the cleaning element on the pressing surface 26a of the head member 26 is brought into abutment with the cleaning target surface (for example, the ferrule end surface on the optical connector).

With the cleaning element on the pressing surface 26a of the head member 26 brought into abutment with the cleaning target surface, when the tool body 10 is additionally pressed forward, the tool body 10 moves in this direction (forward). Accordingly, the tip end of the insertion part 20 is pressed to the cleaning target, and the relative position of the insertion part 20 with respect to the tool body 10 moves rearward (the tool body 10 moves relative to the insertion part 20).

At this time, pressed with the insertion part 20, the supporting part 32 moves rearward with respect to the case body 11. Because this moves the feeding mechanism 13 with respect to the case body 11 together with the supporting part 32, the gear receiving part 56 provides a rotational force to the gear 31a. The rotation of the gear 31a rotates the take-up reel 31, thus rolling up (recovering) the cleaning element. In association with this, the cleaning element is extracted from the supply reel 30 and supplied to the pressing surface 26a of the head member 26. In this way the cleaning element is supplied and recovered.

The movement of the insertion part 20 moves the rotary shaft 52 rearward with respect to the case body 11. This moves the rotary tube part 522 along the cam groove 523, and the rotary shaft 52 axially rotates with the front-rear direction as an axis (the rotation direction). This rotation of the rotary shaft 52 also rotates the head unit 24 (the head member 26); thus, the cleaning element rotates in the rotation direction while in a state of being brought into abutment with the cleaning target surface.

Thus by relatively moving the tool body 10 and the insertion part 20, the cleaning element is supplied and recovered, and the head unit 24 axially rotates with the front-rear direction as its axis (the rotation direction). This allows the cleaning element stretched around the pressing surface 26a of the head member 26 to wipe dirt such as trash, a dust, and an oil content adhering to the cleaning target surface.

To pull out the insertion part 20 from the optical connector after termination of the cleaning, it is only necessary to move the tool body 10 rearward. At this time, an elastic force of the coil spring 34 returns the positional relationship between the supporting part 32 and the case body 11. This rotates the rotary shaft 52 (the head unit 24) in a direction opposite from the pressing direction. When pulling out the insertion part 20, however, because the transmission mechanism (not illustrated) does not transmit the rotation of the gear 31a to the take-up reel 31, the take-up reel 31 does not rotate but just the gear 31a idles.

Arrangement of Cleaning Element

Comparative Example

Figure 6A:
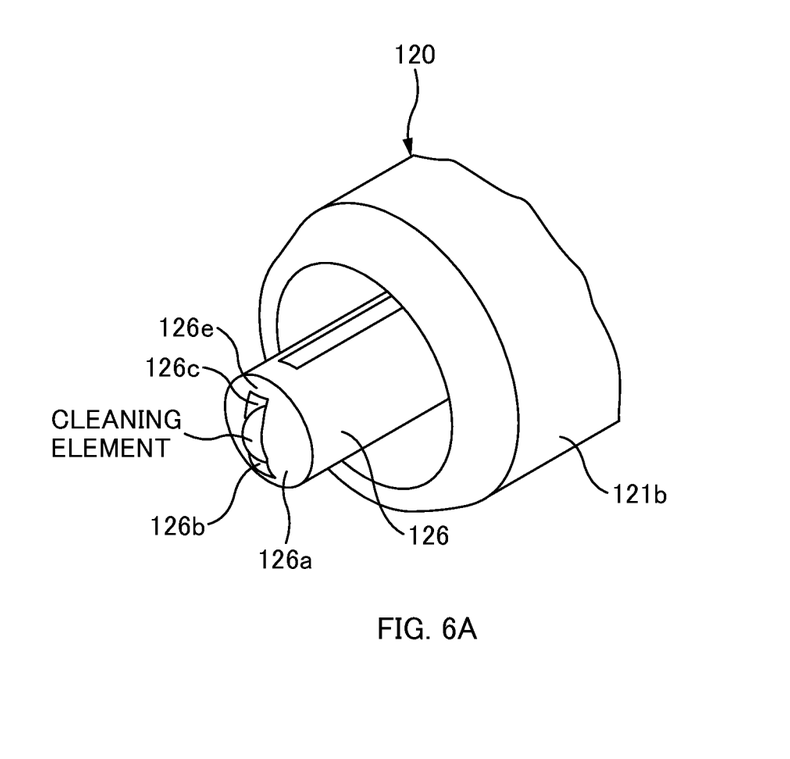
FIG. 6A is a perspective view of a head member 126 of a comparative example.

FIG. 6A is a perspective view of a head member 126 of the comparative example. In this comparative example, the head member 126 projects forward from a leading end tube part 121b of an insertion part 120. The head member 126 is made of a resin, and is formed with an insertion hole 126b and an insertion hole 126c on a pressing surface 126a on the tip end of the head member 126. The cleaning element passes through the insertion hole 126b of the head member 126, reaches the pressing surface 126a, and is recovered through the insertion hole 126c. Thus, in the comparative example, the cleaning element is inserted through the insertion holes 126b and 126c, which are formed on the leading end part of the head member 126, thus preventing the cleaning element from dropping.

In this comparative example, each of openings of the insertion hole 126b and the insertion hole 126c is formed on the pressing surface 126a of the head member 126. This narrows down a region on the pressing surface 126a where the cleaning element is disposed by wall thicknesses of outer peripheries of each of these insertion holes (sections with reference numeral 126e). That is, a length of the cleaning element stretched around the pressing surface 126a shortens, narrowing down a cleaning range. This possibly causes poor cleaning.

The Present Embodiment

Figure 5A:
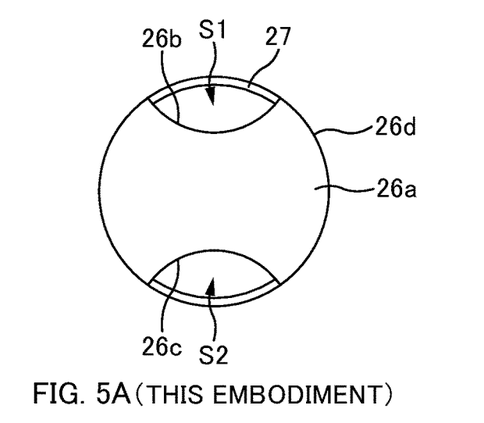
FIG. 5A is a drawing viewing a head member 26 of this embodiment from a front side in a front-rear direction.
Figure 6B:
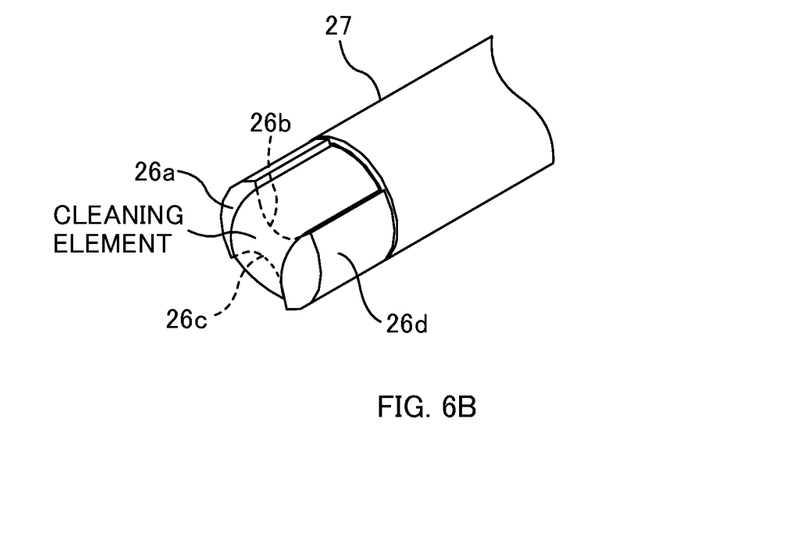
FIG. 6B is a perspective view of the head member 26 (after a cleaning element is disposed) of this embodiment.

FIG. 5A is a drawing viewing the head member 26 of this embodiment from the front side in the front-rear direction. FIG. 6B is a perspective view of the head member 26 (after the cleaning element is disposed) of this embodiment.

As described above, the head member 26 of this embodiment includes the pressing surface 26a, the supply-side guide groove 26b, the recovery-side guide groove 26c, and the collar part 26d. Further, the outer diameter of the collar part 26d of this embodiment has the size almost the same as the outer diameter of the metal tube 27. Accordingly, as illustrated in FIG. 5A, viewing the pressing surface 26a from the front side in the front-rear direction, the collar part 26d of the head member 26 partially hides the leading end part of the metal tube 27 (the end part on the front side).

A clearance S1 is formed between the outer surface of the supply-side guide groove 26b and the inner peripheral surface of the metal tube 27. A clearance S2 is formed between the outer surface of the recovery-side guide groove 26c and the inner peripheral surface of the metal tube 27. The cleaning element is disposed in the clearance S1 on the supply side, and the cleaning element is disposed in the clearance S2 on the recovery side.

Thus, in this embodiment, the pressing surface 26a of the head member 26 is made to be in a projected state from the metal tube 27, and when the pressing surface 26 is viewed from the front side, the cleaning element is disposed in the clearances between the outer surface of the head member 26 and the inner peripheral surface of the metal tube 27 (the clearance S1 and the clearance S2). This eliminates the need for the wall thickness at the section with reference numeral 126e in the comparative example (see FIG. 6A), thus the region of the pressing surface can be enlarged more than that of the comparative example (the enlargement of the cleaning range). The cleaning element is disposed inside the guide grooves (the supply-side guide groove 26b and the recovery-side guide groove 26c), and further the outside is covered with the metal tube 27, thereby dropping of the cleaning element can be restrained.

This embodiment includes the head member 26 configured of a different member separate from the base member 25, which receives the force in the rotation direction. This eases the mounting of the head member 26 and the metal tube 27. Especially, in the case that the head member 26 is formed with the collar part 26d, by configuring the head member 26 with a different member separate from the base member 25 eases the mounting of the metal tube 27.

In this embodiment, viewing the pressing surface 26a from the front side, the collar part 26d of the head member 26 is disposed so as to hide a part of the leading end part (the end part) of the metal tube 27. This allows restraining damage to the cleaning target with the leading end part of the metal tube 27 during cleaning.

In this embodiment, the head member 26 includes the supply-side guide groove 26b and the recovery-side guide groove 26c formed along the front-rear direction, and the cleaning element is disposed in the supply-side guide groove 26b and the recovery-side guide groove 26c. This ensures inhibiting dropping of the cleaning element during the rotation of the head member 26.

In this embodiment, the head member 26 is made of a resin, and the metal tube 27 (the tubular member) is made of a metal. The metal tube 27 is crimped to be secured to the head member 26 in the front-rear direction and the rotation direction. This allows the head member 26 to be reinforced with the metal tube 27, thus restraining breaking of the elongated head member 26.

First Modification

Figure 5B:
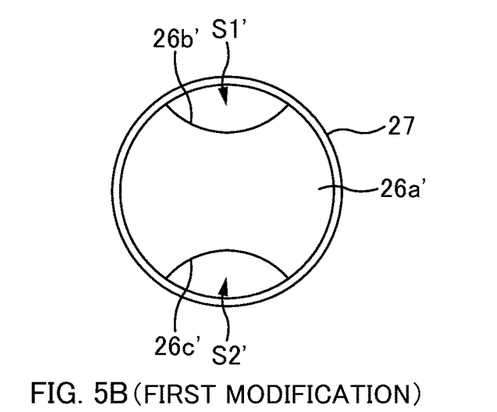
FIG. 5B is a drawing viewing a head member 26' of a first modification from a front side in a front-rear direction.

FIG. 5B is a drawing viewing a head member 26' of the first modification from a front side in the front-rear direction.

The head member 26' of the first modification includes a pressing surface 26a', a supply-side guide groove 26b', and a recovery-side guide groove 26c'. The head member 26', however, does not include the collar part as in the above-described embodiments. As illustrated in FIG. 5B, viewing the head member 26' from the front side in the front-rear direction, the head member 26' does not hide the tip end (the end part) of the metal tube 27. A clearance S1' is formed between the supply-side guide groove 26b' (an outer surface of the head member 26') and the inner peripheral surface of the metal tube 27. A clearance S2' is formed between the recovery-side guide groove 26c' (the outer surface of the head member 26') and the inner peripheral surface of the metal tube 27. The cleaning element is disposed in the clearance S1' on the supply side, and the cleaning element is disposed in the clearance S2' on the recovery side.

Also in this first modification, the pressing surface 26a' of the head member 26' is made to be in a projected state from the metal tube 27, and the cleaning element is disposed at the clearance S1' and the clearance S2' between the outer surface of the head member 26' and the inner peripheral surface of the metal tube 27. Accordingly, the enlargement of a region of the pressing surface 26a' can be achieved while dropping of the cleaning element during the rotation of the head member 26' is restrained.

In the case of the first modification as well, by crimping the metal tube 27 and the head member 26' and crimping the metal tube 27 and the base member 25 (the leading end part 253), the metal tube 27 can be prevented from dropping. It should be noted that, in the first modification, since the head member 26' does not include the collar part, the head member 26' may be integrally molded with the base member 25 with resin (does not need to be separate). In this case, it is only necessary to crimp the metal tube 27 after the insertion of the metal tube 27 from the front side.

Second Modification

Figure 5C:
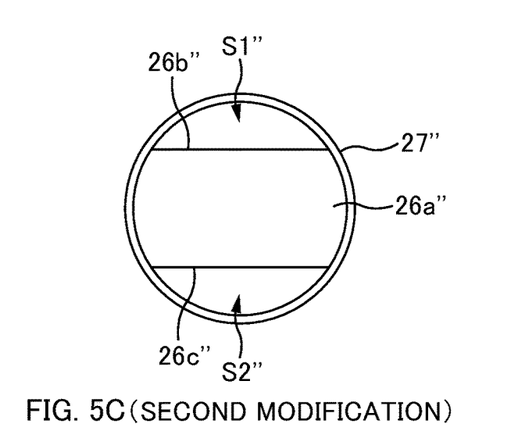
FIG. 5C is a drawing viewing a head member 26' of a second modification from a front side in a front-rear direction.

FIG. 5C is a drawing viewing a head member 26" of the second modification from a front side in the front-rear direction.

The head member 26" according to the second modification is a plate-shaped member and includes a pressing surface 26a", a planar surface part 26b", and a planar surface part 26c". The planar surface part 26b' is provided on the supply side (the upper side in the drawing) of the cleaning element. The planar surface part 26c' is provided on the recovery side (the lower side in the drawing) of the cleaning element. Thus, a clearance S1" is formed between the planar surface part 26h" (an outer surface of the head member 26") and the inner peripheral surface of the metal tube 27. A clearance S2" is formed between the planar surface part 26c" (the outer surface of the head member 26") and the inner peripheral surface of the metal tube 27. The cleaning element is disposed in the clearance S1' on the supply side, and the cleaning element is disposed in the clearance S2" on the recovery side.

Also in this second modification, the pressing surface 26a" of the head member 26" is made to be in a projected state from the metal tube 27, and the cleaning element is disposed in the clearance S1" and the clearance S2' between the outer surface of the head member 26" and the inner peripheral surface of the metal tube 27. Accordingly, the enlargement of a region of the pressing surface 26a" can be achieved while dropping of the cleaning element during the rotation of the head member 26" is restrained.

Similar to the above-described embodiments, in the case of the second modification as well, crimping of the metal tube 27 and the head member 26" and crimping of the metal tube 27 and the base member 25 (the leading end part 253) can prevent the metal tube 27 from dropping. In the second modification as well, the head member 26" may be integrally molded with the base member 25 with resin.

Others Points

The embodiments are intended for easy understanding of the present invention and are not in any way to be construed as limiting the present invention. Needless to say, the present invention may be modified and improved without departing from the scope of the invention, and equivalents thereof are also encompassed by the invention.

REFERENCE SIGNS LIST

1: cleaning tool,
10: tool body,
11: case body,
13: feeding mechanism,
15: rotary mechanism,
20: insertion part,
21: insertion tube body,
21a: base tube part,
21b: leading end tube part,
22: tube part spring,
23: head spring,
24: head unit,
25: base member,
26: head member,
26a: pressing surface,
26b: supply-side guide groove,
26c: recovery-side guide groove,
26d: collar part,
26': head member,
26a': pressing surface,
26b': supply-side guide groove,
26c': recovery-side guide groove,
26": head member,
26a": pressing surface,
26b": planar surface part,
26c": planar surface part,
27: metal tube,
30: supply reel,
31: take-up reel,
31a: gear,
32: supporting part,
33: retaining tube part,
34: coil spring,
52: rotary shaft,
54: insertion protruded part,
56: gear receiving part,
58: pressing plate,
120: insertion part,
121b: leading end tube part,
126: head member,
126a: pressing surface,
126b: insertion hole,
126c: insertion hole,
211: protruding part,
251: base part,
252: flange part,
253: leading end part,
521: guide tube part,
522: rotary tube part,
523: cam groove

The invention claimed is:

1. A cleaning tool comprising:
a tool body; and
an insertion part projecting from the tool body, wherein
the insertion part is movable in a predetermined direction with respect to the tool body,
the insertion part includes a head unit,
the head unit presses a cleaning element against a cleaning target with a pressing surface,
by relatively moving the tool body and the insertion part, the cleaning element is supplied and recovered, and the head unit is rotated in a rotation direction with the predetermined direction as an axis,
the head unit includes a head member, a tubular member, and a base member comprising a leading end part that extends toward the head member,
the head member includes the pressing surface and is configured of a different member separate from the base member,
the head member is inserted into the tubular member with the pressing surface in a projected state,
the head member is inserted into a first end of the tubular member distal to the tool body and the leading end part is inserted into a second end of the tubular member opposite the first end,
the cleaning element is stretched around the pressing surface, and
when viewing the pressing surface from the predetermined direction, the cleaning element is disposed in a clearance between an outer surface of the head member and an inner peripheral surface of the tubular member on a supply side, and the cleaning element is disposed in a clearance between an outer surface of the head member and an inner peripheral surface of the tubular member on a recovery side.

2. A cleaning tool according to claim 1, wherein the base member receives a force in the rotation direction.

3. A cleaning tool according to claim 1, wherein the head member includes a collar part, and when viewing the pressing surface from the predetermined direction, the collar part is arranged to conceal at least a part of an end part of the tubular member.

4. A cleaning tool according to claim 1, wherein the head member includes a supply-side guide groove and a recovery-side guide groove formed along the predetermined direction, and the cleaning element is disposed in the supply-side guide groove and the recovery-side guide groove.

5. A cleaning tool according to claim 1, wherein the head member is made of a resin, the tubular member is made of a metal, and the tubular member is crimped to the head member to be secured to the head member in the predetermined direction and the rotation direction.

* * * * *